(12) United States Patent
Matsushima et al.

(10) Patent No.: US 7,396,428 B2
(45) Date of Patent: Jul. 8, 2008

(54) LASER WELDABLE POLYBUTYLENE TEREPHTHALATE-SERIES RESIN COMPOSITION, AND SHAPED ARTICLE

(75) Inventors: Mitsunori Matsushima, Fuji (JP); Kouichi Sakata, Fuji (JP); Katsunori Takayama, Fuji (JP)

(73) Assignee: Win Tech Polymer Ltd, Tokyo (JP)

( * ) Notice: Subject to any disclaimer, the term of this patent is extended or adjusted under 35 U.S.C. 154(b) by 0 days.

(21) Appl. No.: 11/651,069

(22) Filed: Jan. 9, 2007

(65) Prior Publication Data

US 2007/0135587 A1 Jun. 14, 2007

Related U.S. Application Data

(62) Division of application No. 10/508,876, filed on Sep. 23, 2004, now abandoned.

(30) Foreign Application Priority Data

Apr. 8, 2002 (JP) ............................. 2002/105649
Apr. 8, 2003 (WO) ....................... PCT/JP03/04455

(51) Int. Cl.
*B29C 65/16* (2006.01)
*C08L 67/02* (2006.01)

(52) U.S. Cl. .................... 156/272.8; 524/513; 524/537; 524/539; 525/173; 525/174; 525/175; 525/176; 525/177; 525/439; 525/444

(58) Field of Classification Search .................. None
See application file for complete search history.

(56) References Cited

U.S. PATENT DOCUMENTS 4,115,333 A * 9/1978 Phipps et al. ............... 524/399

| 6,521,326 B1 | | 2/2003 | Fischer et al. |
| 2002/0188073 A1 | | 12/2002 | Uno et al. |
| 2004/0084140 A1 | * | 5/2004 | Kobayashi ............... 156/272.8 |
| 2007/0129475 A1 | * | 6/2007 | Sakata et al. ................. 524/306 |

FOREIGN PATENT DOCUMENTS

| JP | 532800 A | 2/1993 |
| JP | 09291204 | 11/1997 |
| JP | 10-245481 | 9/1998 |
| JP | 11-49937 | 2/1999 |
| JP | 2000007902 | 1/2000 |
| JP | 2001-26656 | 1/2001 |
| WO | WO 01/00409 | 1/2001 |

OTHER PUBLICATIONS

CN Office Action issued May 18, 2007.

* cited by examiner

*Primary Examiner*—David Buttner
(74) *Attorney, Agent, or Firm*—Nixon & Vanderhye PC (57) ABSTRACT

A laser weldable PBT-series resin composition comprises a polybutylene terephthalate (PBT)-series resin (A), and at least one resin (B) selected from the group consisting of a polycarbonate-series resin (b1), a styrenic resin (b2), a polyethylene terephthalate-series resin (b3) and an acrylic resin (b4). The PBT-series resin (A) may be a PBT homopolyester, or a PBT-series copolymer modified with not more than 30 mol % of a copolymerizable monomer (e.g., a bisphenol compound or an adduct thereof with an alkylene oxide, and an asymmetrical aromatic dicarboxylic acid). The ratio (weight ratio) of the resin (B) relative to the PBT-series resin (A) [the former/the latter] is about 0.1/1 to 1.5/1. The resin composition may comprise a glass fiber. The resin composition is excellent in laser weldability, and can improve in welding strength of a shaped article formed from the resin composition.

14 Claims, 2 Drawing Sheets

LASER WELDABLE POLYBUTYLENE TEREPHTHALATE-SERIES RESIN COMPOSITION, AND SHAPED ARTICLE

CROSS REFERENCE TO RELATED APPLICATION

This application is a divisional of commonly owned U.S. application Ser. No. 10/508,876, filed on Sep. 23, 2004 now abandoned, the entire content thereof being hereby expressly incorporated by reference in this application, which in turn is the U.S. national phase of international application PCT/JP03/04455 filed Apr. 8, 2003 which designated the U.S. and claims benefit of JP 105649/2002 dated Apr. 8, 2002.

TECHNICAL FIELD

The present invention relates to a polybutylene terephthalate-series resin composition having a high laser weldability and being excellent in shaping processability (or moldability), and a shaped article using the same.

BACKGROUND ART

A polybutylene terephthalate (PBT)-series resin is excellent in various properties such as heat resistance, chemical resistance, electric properties, mechanical properties and shaping processability (or moldability), and is used for a number of applications. Specific examples of the applications include a variety of automotive electrical components or parts (e.g., various control units, various sensors, and ignition coils), connectors, switch parts, relay parts, and coil parts. For producing these components, a plurality of shaped components or parts are bonded (or joined) to each other with the use of a bonding (or joining) means such as an adhesive, a screw cramp, a snap fit, a hot plate welding, and an ultrasonic welding. Regarding these bonding means, however, some problems have been pointed out. For example, in the case of using an adhesive, the waste of time up to curing of the adhesive, or the burden on the environment becomes an issue. Moreover, in a means using a screw cramp, the labor or the cost required for fastening increases, and in a hot plate welding or an ultrasonic welding, there is fear that a product receives a damage due to heat, vibration, and others.

On the other hand, a bonding (or joining) method by a laser welding has no damage of a product due to heat or vibration involved in the welding, and the welding process is also very simple. Thus, recently the laser welding method has been widely utilized, and has come to attract attention as a welding manner for various resin components or parts.

However, it is pointed out that, in the case of bonding a PBT-series resin with a laser welding, the resin cannot be substantially welded because of carbonization or others due to a low transmittance of a laser beam. Japanese Patent Application Laid-Open No. 26656/2001 (JP-2001-26656A) discloses that a shaped article formed from a polyester-series copolymer having a melting point within a specific range is bonded to other shaped article by welding processing to form a united shaped article. This document describes that a homopolyalkylene arylate resin (a polybutylene terephthalate, a polyethylene terephthalate, and a polyethylene naphthalate) has a low laser welding strength.

Japanese Patent Application Laid-Open No. 245481/1998 (JP-10-245481A) discloses a thermoplastic resin composition which comprises a composition composed of a thermoplastic polycarbonate resin and a thermoplastic polyester resin (such as a polyethylene terephthalate) and a methacrylic ester-series resin (graft resin) blended therewith in a proportion of 1 to 10% by weight, in which the methacrylic ester-series resin is obtained by graft-polymerizing a monomer containing a methacrylic ester as a main component in the presence of a crosslinked acrylic ester-series elastic body. This document mentions an embodiment in which a bisphenol A-based polycarbonate resin and a polyethylene terephthalate resin are used in a proportion of 1.5/1 to 4/1 (weight ratio) in the resin composition. Further, as a heat-welding method of the resin composition, a hot plate welding, a vibration welding or an ultrasonic welding is also described. In this composition, however, it is necessary to use the graft resin in order to improve welding strength of the composition, and the use of the graft resin tends to deteriorate mechanical strength, heat resistance or others of the composition.

It is therefore an object of the present invention to provide a laser weldable PBT-series resin composition having an excellent laser weldability and a high welding strength even in the case of using a PBT-series resin as a base, and a shaped article formed from the same.

It is another object of the present invention to provide a shaped article of a PBT-series resin, which is high in light transmittance and welding strength.

DISCLOSURE OF THE INVENTION

The inventors of the present invention made intensive studies to achieve the above objects and finally found that a combination use of a PBT-series resin and a specific resin dramatically improves laser weldability of a PBT-series resin composition and realizes to maintain a high weld strength. The present invention was accomplished based on the above finding.

That is, the laser weldable polybutylene terephthalate-series resin composition of the present invention comprises a polybutylene terephthalate-series resin (A) and at least one resin (B) selected from the group consisting of a polycarbonate-series resin (b1), a styrenic resin (b2), a polyethylene terephthalate-series resin (b3) and an acrylic resin (b4). The polybutylene terephthalate-series resin (A) may be a polybutylene terephthalate or a polybutylene terephthalate-series copolymer modified with a copolymerizable monomer (e.g., a monomer of 0.01 to 30 mol %). The melting point of the polybutylene terephthalate-series resin (A) may for example be not lower than 190° C. The copolymerizable monomer may be at least one member selected from the group consisting of a bisphenol compound or an adduct thereof with an alkylene oxide, and an asymmetrical aromatic dicarboxylic acid or a derivative thereof capable of forming an ester (for example, phthalic acid, isophthalic acid, an adduct of bisphenol A with an alkylene oxide, and a reactive derivative thereof). The ratio of the resin (B) relative to the polybutylene terephthalate-series resin (A) [the former (B)/the latter (A)] may be about 0.10/1 to 1.5/1 (weight ratio). The resin composition may further comprise a reinforcer capable of transmitting a laser beam (for example, a glass fiber). The resin composition may have a light transmittance of not less than 15% for a wavelength of 800 to 1100 nm at a thickness of 3 mm in a shaped article formed from the resin composition by an injection molding.

The laser weldable polybutylene terephthalate-series resin composition of the present invention comprises at least one polybutylene terephthalate-series resin (A) selected from the group consisting of a polybutylene terephthalate and a polybutylene terephthalate-series copolymer modified with 0.01 to 30 mol % (e.g., 1 to 20 mol %) of a copolymerizable monomer, and at least one resin (B) selected from the group consisting of a polycarbonate-series resin (b1), a styrenic resin (b2), a polyethylene terephthalate-series resin (b3) and an acrylic resin (b4); wherein the ratio of the resin (B) relative to the polybutylene terephthalate-series resin (A) [the former (B)/the latter (A)] is 0.10/1 to 1.5/1, and the copolymerizable monomer comprises at least one member selected from the group consisting of phthalic acid, isophthalic acid, an adduct of bisphenol A with an alkylene oxide, and a reactive derivative thereof.

The present invention includes a shaped article formed from the resin composition, and also includes a shaped composite article comprising the shaped article and a counterpart shaped article formed from a resin, wherein the shaped article is bonded to the counterpart shaped article through a welding by a laser.

DETAILED DESCRIPTION OF THE INVENTION

[Polybutylene Terephthalate-Series Resin Composition]

(A) Polybutylene Terephthalate-Series Resin

The polybutylene terephthalate (PBT)-series resin as a base resin includes a homopolyester or copolyester (a polybutylene terephthalate, a polybutylene terephthalate copolyester) containing a butylene terephthalate as a main component (e.g., about 50 to 100% by weight, preferably about 60 to 100% by weight, and more preferably about 75 to 100% by weight). In particular, a copolyester is preferred.

As the copolymerizable monomer (or comonomer) in the copolyester (a butylene terephthalate-series copolymer or a modified PBT resin) (hereinafter, sometimes simply refers to a copolymerizable monomer), there may be mentioned a dicarboxylic acid other than terephthalic acid, a diol other than 1,4-butanediol, a hydroxycarboxylic acid, a lactone, and others. The copolymerizable monomer may be used singly or in combination.

The dicarboxylic acid component includes, for example, an aliphatic dicarboxylic acid (e.g., a dicarboxylic acid having about 4 to 40 carbon atoms such as succinic acid, glutaric acid, adipic acid, pimelic acid, suberic acid, azelaic acid, sebacic acid, undecanedicarboxylic acid, dodecanedicarboxylic acid, hexadecanedicarboxylic acid and dimeric acid, preferably a dicarboxylic acid having about 4 to 14 carbon atoms), an alicyclic dicarboxylic acid (e.g., a dicarboxylic acid having about 8 to 12 carbon atoms such as hexahydrophthalic acid, hexahydroisophthalic acid, hexahydroterephthalic acid, and himic acid), an aromatic dicarboxylic acid other than terephthalic acid [e.g., a dicarboxylic acid having about 8 to 16 carbon atoms such as phthalic acid, isophthalic acid; a naphthalenedicarboxylic acid (such as 2,6-naphthalenedicarboxylic acid); 4,4'-diphenyldicarboxylic acid, 4,4'-diphenyletherdicarboxylic acid, 4,4'-diphenylmethanedicarboxylic acid, and 4,4'-diphenylketonedicarboxylic acid], or a reactive derivative thereof [e.g., a derivative, capable of forming an ester, such as a lower alkyl ester (e.g., a $C_{1-4}$alkyl ester of phthalic acid or isophthalic acid, such as dimethyl phthalate and dimethyl isophthalate (DMI)), an acid chloride, and an acid anhydride]. Further, if necessary, the dicarboxylic acid component may be used in combination with a polyfunctional carboxylic acid such as trimellitic acid and pyromellitic acid.

As the diol, for example, there are mentioned an aliphatic alkylene glycol other than 1,4-butanediol (e.g., an aliphatic glycol having about 2 to 12 carbon atoms such as ethylene glycol, trimethylene glycol, propylene glycol, neopentyl glycol, hexanediol, octanediol and decanediol, preferably an aliphatic glycol having about 2 to 10 carbon atoms), a polyoxyalkylene glycol [e.g., a glycol having a plurality of oxyalkylene units of which the alkylene group has about 2 to 4 carbon atoms, for example, diethylene glycol, dipropylene glycol, ditetramethylene glycol, triethylene glycol, tripropylene glycol, a polytetramethylene glycol], an alicyclic diol (e.g., 1,4-cyclohexanediol, 1,4-cyclohexanedimethanol, hydrogenated bisphenol A), an aromatic diol [e.g., a $C_{6-14}$ aromatic diol such as hydroquinone, resorcinol and naphthalenediol; biphenol; a bisphenol compound; and xylylene glycol], and others. Further, if necessary, the diol may be used in combination with a polyol such as glycerin, trimethylolpropane, trimethylolethane and pentaerythritol.

The bisphenol compound includes a bis(hydroxyaryl)$C_{1-6}$alkane such as bis(4-hydroxyphenyl)methane (bisphenol F), 1,1-bis(4-hydroxyphenyl)ethane (bisphenol AD), 1,1-bis(4-hydroxyphenyl)propane, 2,2-bis(4-hydroxyphenyl)propane (bisphenol A), 2,2-bis(4-hydroxy-3-methylphenyl)propane, 2,2-bis(4-hydroxyphenyl)butane, 2,2-bis(4-hydroxyphenyl)-3-methylbutane, 2,2-bis(4-hydroxyphenyl)hexane, and 2,2-bis(4-hydroxyphenyl)-4-methylpentane; a bis(hydroxyaryl) $C_{4-10}$cycloalkane such as 1,1-bis(4-hydroxyphenyl)cyclopentane and 1,1-bis(4-hydroxyphenyl)cyclohexane; 4,4'-bis(4-hydroxyphenyl)ether; 4,4'-dihydroxydiphenyl sulfone; 4,4'-dihydroxydiphenyl sulfide; 4,4'-dihydroxydiphenyl ketone, and an adduct thereof with an alkylene oxide. The adduct with an alkylene oxide includes an adduct of a bisphenol compound (e.g., bisphenol A, bisphenol AD and bisphenol F) with a $C_{2-3}$alkylene oxide, e.g., 2,2-bis-[4-(2-hydroxyethoxy)phenyl]propane, diethoxylated bisphenol A (bisphenol A ethoxylate, EBPA), 2,2-bis[4-(2-hydroxypropoxy)phenyl]propane, dipropoxylated bisphenol A, and others. In the adduct with an alkylene oxide, the mole number of the added alkylene oxide (a $C_{2-3}$alkylene oxide such as ethylene oxide and propylene oxide) is about 1 to 10 mol, and preferably about 1 to 5 mol relative to each hydroxyl group.

The hydroxycarboxylic acid includes, for example, a hydroxycarboxylic acid such as hydroxybenzoic acid, hydroxynaphthoic acid, hydroxyphenylacetic acid, glycolic acid and hydroxycaproic acid, or a derivative thereof. Exemplified as the lactone is a $C_{3-12}$lactone such as propiolactone, butyrolactone, valerolactone, and caprolactone (e.g., ε-caprolactone), and others.

Examples of the preferred copolymerizable monomer includes a diol compound [e.g., a $C_{2-6}$alkylene glycol (e.g., a linear alkylene glycol such as ethylene glycol, trimethylene glycol, propylene glycol and hexanediol), a polyoxy$C_{2-4}$alkylene glycol which has a repeating oxyalkylene unit of about 2 to 4 (e.g., diethylene glycol), and a bisphenol compound (e.g., a bisphenol compound, or an alkylene oxide adduct thereof)], and a dicarboxylic acid compound [e.g., $C_{6-12}$ aliphatic dicarboxylic acid (such as adipic acid, pimelic acid, suberic acid, azelaic acid, and sebacic acid), an asymmetrical aromatic dicarboxylic acid having carboxyl groups as a substituent at asymmetric positions of the arene ring, and 1,4-cyclohexanedimethanol]. Among these compounds, the preferred one includes an aromatic compound, e.g., the alkylene oxide adduct of a bisphenol compound (particularly bisphenol A), and an asymmetrical aromatic dicarboxylic acid [e.g., phthalic acid, isophthalic acid, and a reactive derivative thereof (e.g., a lower alkyl ester such as dimethyl isophthalate (DMI)].

The proportion (modifying amount) of the copolymerizable monomer is usually not more than 30 mol % (0 to 30 mol %). In the copolymer, the proportion of the copolymerizable monomer may for example be selected from a range of about 0.01 to 30 mol %, usually about 1 to 30 mol % (e.g., about 1 to 20 mol %), preferably about 3 to 25 mol %, and more preferably about 5 to 20 mol % (e.g., about 5 to 15 mol %).

From the viewpoint of laser weldability, the melting point of the PBT-series resin is not lower than 190° C. (e.g., about 190 to 270° C.), preferably about 200 to 260° C., and more preferably about 210 to 250° C.

The PBT-series resin may be produced from a co-polymerization of terephthalic acid or a reactive derivative thereof, 1,4-butanediol, and if necessary a copolymerizable monomer by a conventional manner, for example, transesterification and direct esterification.

(B) Resin (Second Resin)

The resin (B) for improving laser weldability of the PBT-series resin in combination with the PBT-series resin includes a polycarbonate (PC)-series resin (b1), a styrenic resin (b2), a polyethylene terephthalate (PET)-series resin (b3), and an acrylic resin (b4). These second resins (B) may be used singly or in combination. Incidentally, in combination with the polybutylene terephthalate-series resin (A) and the resin (B), the resin composition may form a polymer alloy.

(b1) Polycarbonate (PC)-Series Resin

The polycarbonate-series resin includes a polymer obtainable through the reaction of a dihydroxy compound with phosgene or a carbonic ester such as diphenyl carbonate. The dihydroxy compound may be an alicyclic compound, and is preferably an aromatic compound (in particular, a bisphenol compound). The dihydroxy compound may be used singly or in combination.

The bisphenol compound includes a bisphenol compound exemplified in the paragraph of the PBT-series resin (e.g., a bis(hydroxyaryl)$C_{1-6}$alkane; a bis(hydroxyaryl) $C_{4-10}$cycloalkane; 4,4'-dihydroxydiphenyl ether; 4,4'-dihydroxydiphenyl sulfone; 4,4'-dihydroxydiphenyl sulfide; and 4,4'-dihydroxydiphenyl ketone). The preferred polycarbonate-series resin includes a bisphenol A-based polycarbonate. The polycarbonate-series resin may be used singly or in combination.

(b2) Styrenic Resin

As the styrenic resin, for example, there may be mentioned a homo- or copolymer of a styrenic monomer (e.g., styrene, vinyltoluene, α-methylstyrene); a copolymer of the styrenic monomer and a vinyl monomer (e.g., an unsaturated nitrile (such as (meth)acrylonitrile), an α,β-monoolefinic unsaturated carboxylic acid or acid anhydride or an ester thereof (such as a (meth)acrylic acid ester, (meth)acrylic acid, and maleic anhydride), a maleimide-series monomer (such as maleimide, an N-alkylmaleimide, and N-phenylmaleimide)); a styrenic graft copolymer; and a styrenic block copolymer. Examples of the polystyrenic graft copolymer includes a resin in which styrene, and acrylonitrile and/or methyl methacrylate are graft-polymerized to a rubber component such as a polybutadiene, an acrylic rubber, a chlorinated polyethylene, an ethylene-vinyl acetate copolymer, an ethylene-propylene rubber, an ethylene-propylene-diene rubber and a styrene-butadiene copolymer rubber (e.g., an ABS resin, and a MBS resin). As the block copolymer, there may be mentioned, for example, a styrene-butadiene-styrene (SBS) block copolymer, a styrene-isoprene block copolymer, a styrene-isoprene-styrene (SIS) block copolymer, a hydrogenated styrene-butadiene-styrene (SEBS) block copolymer, and a hydrogenated styrene-isoprene-styrene (SEPS) block copolymer. These styrenic resins may be used singly or in combination.

The preferred styrenic resin includes a polystyrene (GPPS) and a styrene-(meth)acrylic ester copolymer (such as a styrene-methyl methacrylate copolymer), a styrene-(meth)acrylic acid copolymer, a styrene-maleic anhydride copolymer, a styrene-acrylonitrile copolymer (AS resin), a graft copolymer in which at least a styrenic monomer is graft-polymerized to a rubber component [for example, a high impact polystyrene (HIPS), an ABS resin, and a MBS resin] or a block copolymer (e.g., a SBS block copolymer, a SIS block copolymer, a SEBS block copolymer, and a SEPS block copolymer), and others.

(b3) Polyethylene Terephthalate (PET)-Series Resin

The polyethylene terephthalate-series resin includes a homopolyester or a copolyester (a polyethylene terephthalate, a polyethylene terephthalate copolyester) containing ethylene terephthalate as a main unit (e.g., about 50 to 100% by weight, preferably about 60 to 100% by weight, and more preferably about 75 to 100% by weight), and others.

As the copolymerizable monomer for the copolyester (an ethylene terephthalate-series copolymer or a modified PET resin), there may be mentioned a dicarboxylic acid other than terephthalic acid, a diol other than ethylene glycol, a hydroxycarboxylic acid, a lactone, and others. As these copolymerizable monomers, copolymerizable monomers as exemplified in the paragraph of the PBT-series resin may be used, respectively, in addition to butanediol. The copolymerizable monomer may be used singly or in combination.

The preferred copolymerizable monomer includes a monomer exemplified in the paragraph of the PBT-series resin, for example, a diol compound [e.g., a $C_{3-6}$alkylene glycol (e.g., a linear or branched alkylene glycol such as trimethylene glycol, propylene glycol and butanediol), a polyoxyalkylene glycol, a bisphenol compound or an alkylene oxide adduct thereof], a dicarboxylic acid compound (e.g., a $C_{6-12}$aliphatic dicarboxylic acid, an asymmetrical aromatic dicarboxylic acid, and 1,4-cyclohexane dimethanol).

In the copolymer, the proportion (modifying ratio) of the copolymerizable monomer is about 1 to 30 mol %, preferably about 3 to 25 mol %, and more preferably about 5 to 20 mol %.

The PET-series resin may be produced by a copolymerization of terephthalic acid, ethylene glycol, and if necessary a copolymerizable monomer with a conventional manner, for example, transesterification and direct esterification.

(b4) Acrylic Resin

The acrylic resin includes, for example, a homo- or copolymer of (meth)acrylic monomer(s) (e.g., (meth)acrylic acid or an ester thereof), a copolymer of (meth)acrylic monomer(s) and other copolymerizable monomer(s), and others.

The (meth)acrylic monomer includes (meth)acrylic acid, a (meth)acrylic ester [e.g., a $C_{1-18}$alkyl ester of (meth)acrylic acid such as methyl (meth)acrylate, ethyl (meth)acrylate, butyl (meth)acrylate and 2-ethylhexyl (meth)acrylate, a hydroxyalkyl (meth)acrylate such as 2-hydroxyethyl (meth) acrylate and 2-hydroxyethyl (meth)acrylate, glycidyl (meth) acrylate], (meth)acrylamide, (meth)acrylonitrile, and others.

Examples of other copolymerizable monomer include a styrenic monomer (e.g., styrene, vinyltoluene, α-methylstyrene, chlorostyrene, vinylnaphthalene, and vinylcyclohexane), a polymerizable polycarboxylic acid (e.g., fumaric acid, and maleic acid), a maleimide-series monomer (e.g., maleimide, an N-alkylmaleimide, and N-phenylmaleimide), a diene-series monomer (e.g., isoprene, 1,3-butadiene, 1,4-hexadiene, and dicyclopentadiene), a vinyl-series monomer (e.g., a vinyl ester such as vinyl acetate and vinyl propionate; a vinyl ketone such as methyl vinyl ketone and methyl isopropenyl ketone; a vinyl ether such as a vinyl isobutyl ether and vinyl methyl ether; a nitrogen-containing vinyl monomer such as N-vinylcarbazole, N-vinylpyrrolidone and N-vinylimidazole), and others. These copolymerizable monomers may be used singly or in combination.

The preferred acrylic resin includes, for example, a poly(meth)acrylic acid, a poly(meth)acrylic ester (e.g., a poly(methyl methacrylate) (PMMA)), a methyl methacrylate-acrylate copolymer, a methyl methacrylate-acrylic acid copolymer, and a methyl methacrylate-styrene copolymer (MS resin).

Among these resins (B), the polycarbonate-series resin (b1) and the polyethylene terephthalate-series resin (b3) are preferred, and in particular, the polycarbonate-series resin (b1) is preferred.

The proportion of the resin (B) relative to the polybutylene terephthalate-series resin (A) may be suitably selected as far as the resin composition does not deteriorate in laser weldability, and for example, the former/the latter (weight ratio) is about 0.1/1 to 1.5/1, preferably about 0.20/1 to 1.2/1, and more preferably about 0.25/1 to 1.2/1 (e.g., about 0.3/1 to 1.1/1). Such a resin composition has a high transparency (or penetrability) relative to a laser beam, and can be effectively fused to a shaped article of a counterpart.

The resin composition may comprise a reinforcer (C). Such a reinforcer (C) includes a fibrous reinforcer [for example, an inorganic fiber (e.g., a glass fiber, an asbestos fiber, a carbon fiber, a silica fiber, an alumina fiber, a silica-alumina fiber, a zirconia fiber, a potassium titanate fiber, a silicon carbide fiber, a whisker (e.g., a whisker of a silicon carbide, a whisker of an alumina and a whisker of a silicon nitride)), and an organic fiber (for example, a fiber formed from an aliphatic or aromatic polyamide, an aromatic polyester, a fluorine-containing resin, an acrylic resin such as a polyacrylonitrile, a rayon or the like)], a plate-like reinforcer (for example, a talc, a mica, a glass flake, and a graphite), a particulate reinforcer [for example, a glass bead, a glass powder, a milled fiber (e.g., a milled glass fiber), and a wollastonite]. Incidentally, the wollastonite may be any form such as a plate-like, a columnar, and a fibrous form. The average diameter of the fibrous reinforcer may for example be about 1 to 50 μm (preferably about 3 to 30 μm), and the average length thereof may for example be about 100 μm to 3 mm (preferably about 500 μm to 1 mm). Moreover, the average particle size of the plate-like or particulate reinforcer may for example be about 0.1 to 100 μm, and preferably about 0.1 to 50 μm. These reinforcers may be used singly or in combination.

Among these reinforcers, a reinforcer capable of transmitting (or penetrating) a laser beam is preferred. Such a reinforcer may be selected depending on the wavelength of the laser beam. Examples of such a reinforcer include a glass-series or vitreous reinforcer (e.g., a glass fiber, a glass flake, a glass bead, and a glass powder). In particular, a glass fiber, for example, a glass fiber having a high strength and rigidity (e.g., chopped strand), and others are preferred.

The proportion of the reinforcer (C) in the resin composition is, for example, about 1 to 60% by weight, preferably about 5 to 50% by weight, and more preferably about 10 to 45% by weight.

To the resin composition may be added various additives, f or example, a stabilizer (e.g., an antioxidant, an ultraviolet ray absorbing agent, and a heat stabilizer), a flame retardant, a lubricant, a mold-release agent (or releasing agent), an antistatic agent, a filler (e.g., an inorganic filler), a coloring agent such as a colorant, a dispersing agent, and a plasticizer. Moreover, if necessary, the resin composition may be used in combination with other resin (e.g., a thermoplastic resin, and a thermosetting resin).

The PBT-series resin composition of the present invention may be a particulate mixture or a molten mixture (e.g., a pellet). The resin composition of the present invention has a high moldability, and ensures to produce a shaped article or shaped form having a high mechanical strength and a high heat resistance. In particular, the shaped article formed from the resin composition of the present invention, in spite of being formed from a PBT-series resin composition, is high in light transmittance (particularly light transmittance relative to a laser be am) and suitable for laser welding. For example, in a shaped article, having a thickness of 3 mm, formed by injection-molding a PBT-series resin composition containing a glass fiber (at a mold temperature of 400° C.), for a wavelength of 800 to 1100 nm the light transmittance is about not less than 15% (e.g., about 17 to 70%), preferably about not less than 18% (e.g., about 20 to 60%), and more preferably about not less than 22% (e.g., about 25 to 50%). Further, since the resin composition of the present invention is high in laser weldability, the resin composition is useful for producing a shaped article to weld through the use of a laser beam.

[Shaped Article]

The shaped article may be produced by subjecting the resin composition comprising the PBT-series resin (A), the resin (B), and preferably the reinforcer (C) to a conventional method, for example, (1) a method comprising mixing each component, kneading and extruding the resulting mixture into pellets with a uniaxial or biaxial extruder, and molding the pellets, (2) a method comprising once making pellets (master batch) different in formulation, mixing (diluting) the pellets in a certain proportion, and molding the resulting pellets to give a shaped article having a predetermined formulation, or (3) a method comprising directly charging one or not less than 2 of each component to give the composition, and molding the composition with a molding machine. Incidentally, the pellet may for example be prepared by melt-mixing components except for a brittle or fragile component (such as a glass-series reinforcer), and then mixing the brittle or fragile component with the mixture.

The shaped article may be formed by melt-kneading the PBT-series resin composition and molding with the use of a conventional manner such as an extrusion molding, an injection molding, a compression molding, a blow molding, a vacuum molding, a rotational molding and a gas injection molding, usually with an injection molding. Incidentally, the mold temperature on the injection molding is about 23 to 90° C., preferably about 23 to 60° C., and more preferably about 30 to 50° C.

The shape (or configuration) of the shaped article is not particularly limited to a specific one. Since the shaped article is bonded to a counterpart material (other shaped article formed from a resin) through a welding by a laser, the shaped article is usually formed of a shape having at least a contact surface (e.g., a flat surface), for example, a plate-like form. Moreover, the shaped article of the present invention is high in transmittance (or penetrability) relative to a laser beam, and the thickness of the laser beam-transmitting site in the shaped article (the thickness of the laser beam-transmitting direction) may be selected from a wide range, for example, may be about 0.1 to 5 mm, preferably about 0.1 to 3 mm (e.g., about 0.5 to 2 mm).

The light source of the laser beam is not particularly limited to a specific one, and includes, for example, a dye laser, a gas laser, (e.g., an excimer laser, an argon laser, a krypton laser, and a helium-neon laser), a solid-state laser (e.g., a YAG laser), a semiconductor laser, and others. As the laser beam, a pulsed laser is usually employed.

Incidentally, the laser-scanning rate (or moving speed of a laser-irradiation position on a sample) may be arbitrarily selected. However, in the case where enough welding is required, the laser-scanning rate is about 0 to 150 mm/second, preferably about 0 to 100 mm/second, and more preferably about 0 to 50 mm/second, because there is a possibility that fast scanning rate induces incomplete welding.

The shaped article is excellent in laser weldability, and usually, the shaped article is preferably welded to a resin shaped article as a counterpart by a laser beam. If necessary, the shaped article may be also welded to other resin shaped article by other heat-welding method, for example, a vibration welding, an ultrasonic welding, and a hot plate welding.

In the shaped composite article of the present invention, a shaped article (first shaped article) formed from the PBT-series resin composition and a resin shaped article as a counterpart (second shaped article, adherend) are welded and united by a laser welding. For example, the shaped composite article may be obtained as a united shaped form by the following manner: the first shaped article and the second shaped article (particularly, at least joining parts of both articles) are brought into contact with each other (particularly, at faces of each joining parts), closely contacted at each joining faces through partly fusing the interface of the articles by a laser irradiation to be bonded or joined each other with cooling, and finally united or connected to be the sole shaped form. Use of the shaped article of the present invention for such a shaped composite article ensures a high bonded strength by a welding and such a bonded strength is as high as that of a non-welded shaped article. Therefore, the present invention can provide a shaped composite article firmly bonded without substantial deterioration of the bonded strength due to a laser welding. For example, assuming that the strength of the non-welded member is taken as 100, a shaped composite article welded in a welding strength of about 80 to 100 can be obtained.

The resin constituting the resin shaped article as the counterpart is not particularly limited to a specific one, and includes various thermoplastic resin, for example, an olefinic resin, a vinylic resin, a styrenic resin, an acrylic resin, a polyester-series resin, a polyamide-series resin, a polycarbonate-series resin, and others. Among these resins, the counterpart may comprise the same kind or type of resin as the resin constituting the PBT-series resin composition (e.g., a polyester-series resin such as a PBT-series resin and a PET-series resin, a polycarbonate-series resin, a styrenic resin, and an acrylic resin), or a composition thereof. For example, the first shaped article and the second shaped article may be formed from the PBT-series resin composition of the present invention, respectively.

The adherend may contain an absorbent for a laser beam or a coloring agent. The coloring agent may be selected depending on the wavelength of the laser beam, and includes an inorganic pigment [for example, a black pigment such as a carbon black (e.g., an acetylene black, a lampblack, a thermal black, a furnace black, a channel black, and Ketjen black), a red pigment (such as an iron oxide), an orange pigment (such as a molybdate orange), and a white pigment (such as a titanium oxide)], an organic pigment (e.g., a yellow pigment, an orange pigment, a red pigment, a blue pigment, and a green pigment), and others. These absorbents may be used singly or in combination. As the absorbent, a black pigment or dye, particularly a carbon black, may be usually employed. The average particle size of the carbon black may be usually about 10 to 1000 nm, and preferably about 10 to 100 nm. The proportion of the coloring agent is about 0.1 to 10% by weight, and preferably 0.3 to 5% by weight (e.g., about 0.3 to 3% by weight), relative to the total amount of the adherend.

The irradiation (or impingement) of the laser beam is usually conducted in the direction toward the second shaped article from the first shaped article, and the first and the second shaped articles are welded to each other by generation of heat in the interface of the second shaped article containing the absorbent or the coloring agent. Incidentally, if necessary, through the use of a lens system, the contact surface between the first and the second shaped articles may be welded by focusing the laser beam on the interface.

The preferred embodiment of the present invention includes a laser weldable PBT-series resin composition comprising a PBT-series resin (A) and a polycarbonate (PC)-series resin (B) (and if necessary, a reinforcer (C) capable of transmitting a laser beam). The ratio (weight ratio) of the PC-series resin (B) relative to the PBT-series resin (A) may be about 0.1/1 to 1.5/1. The PBT-series resin (A) includes a PBT or a PBT-series copolymer modified with (or containing) about not more than 30 mol % of a copolymerizable monomer (e.g., a bisphenol compound or an adduct thereof with an alkylene oxide, an asymmetrical aromatic dicarboxylic acid, and a derivative thereof capable of forming an ester). The resin composition may have a light transmittance of not less than 15% for a wavelength of 800 to 1100 nm at a thickness of 3 mm in a shaped article formed from the resin composition by an injecting molding.

The further preferred embodiment of the present invention includes a laser weldable PBT-series resin composition which comprises at least one PBT-series resin (A) selected from the group consisting of a PBT and a PBT-series copolymer modified with (or containing) 1 to 20 mol % of a copolymerizable monomer, and a PC-series resin (B) (and if necessary, a glass fiber (C)); wherein the ratio (weight ratio) of the resin (B) relative to the PBT-series resin (A) is 0.1/1 to 1.5/1, and the copolymerizable monomer is at least one member selected from the group consisting of phthalic acid, isophthalic acid, an adduct of bisphenol A with an alkylene oxide, and a reactive derivative thereof.

The preferred embodiment of the present invention also includes a shaped article formed from the resin composition; and a shaped composite article comprising the shaped article, and a counterpart shaped article formed from a resin, wherein the shaped article is bonded to the counterpart shaped article through a welding by a laser.

According to the present invention, the combination use of the PBT-series resin and the specific resin ensures to provide a composition and a shaped article which are excellent in laser weldability even containing the PBT-series resin as a base, and to obtain a shaped composite article having a high welding strength by welding. Moreover, according to the present invention, the light transmittance and welding strength of the PBT-series resin shaped article can be increased.

INDUSTRIAL APPLICABILITY

The resin composition of the present invention has a high laser weldability, and therefore the resin composition is useful for producing a shaped article to be welded with the use of a laser beam. Moreover, the shaped article of the present invention is excellent in laser weldability, and is valuable for being subjected to welding to a resin shaped article as a counterpart by a laser beam welding. Since the obtained shaped composite article has a high welding strength and less damages the PBT-series resin due to the laser irradiation, the shaped composite article can be applied for various applications, for example, an electric or electronic device part, an office automation (OA) device part, a household electrical appliance part, a mechanical device part, an automotive part, and others. In particular, the shaped composite article can be preferably utilized for an automotive electrical component or part (e.g., various control units, and an ignition coil part), a motor part, various sensor parts, a connector part, a switch part, a relay part, a coil part, a transformer part, a lamp part, and others.

EXAMPLES

The following examples are intended to describe this invention in further detail and should by no means be interpreted as defining the scope of the invention.

In Examples and Comparative Examples, the following PBT-series resin (A), resin (B) and glass fiber (C) were used.

PBT-Series Resin (A)

(A-1) Polybutylene Terephthalate (Manufactured by Win Tech Polymer Ltd., "DX2000")

(A-2) PBT Resin Modified with Dimethyl Isophthalate (DMI)

In a reaction of terephthalic acid with 1,4-butanediol, 12.5 mol % of DMI was used as a copolymerizable component in place of part of terephthalic acid (12.5 mol %), and a modified polybutylene terephthalate was prepared.

(A-3) PBT Resin Modified with Diethoxybisphenol A (EBPA)

In a reaction of terephthalic acid with 1,4-butanediol, 10.0 mol % of EBPA was used as a copolymerizable component in place of part of 1,4-butanediol (10.0 mol %), and a modified polybutylene terephthalate was prepared.

Resin (B)

(B-1) Polycarbonate (PC) Resin (Manufactured by Teijin Chemicals Ltd., "PANLITE L1225")

(B-2) Acrylonitrile-Styrene (AS) Resin (Manufactured by Daicel Chemical Industries, Ltd., "CEVIAN N AP-20")

(B-3) Polyethylene Terephthalate (PET) Resin (Manufactured by Teijin Ltd., "TR8580HP")

Glass Fiber (C)

A glass fiber having an average fiber diameter of 11 μm and an average fiber length of 3 mm was used.

EXAMPLES 1 TO 24 AND COMPARATIVE EXAMPLES 1 TO 13

The PBT-series resin (A), the resin (B) and the glass fiber (C) were kneaded by using a biaxial extruder (manufactured by Japan Steel Works, Ltd., 30 mmφ) at 250° C. in a proportion shown in Tables 1 to 4 to prepare a pellet. Thus obtained pellet was molded into a test piece "A" (7 cm in length, 1 cm in width and 3 mm in thickness) by an injection molding machine (manufactured by Toshiba Corporation) at a cylinder temperature of 250° C. under a condition of a mold temperature shown in Tables.

Moreover, a test piece "B" to be welded to the test piece "A" was produced in the same manner as the test piece "A" except that 3 part by weight of a carbon master batch for coloring (manufactured by Win Tech Polymer Ltd., trade name "2020B") was used relative to 100 parts by weight of the pellet to color the pellet. Incidentally, the test piece "B" acts as a heating element in which heat is generated by a laser beam.

Figure 1:
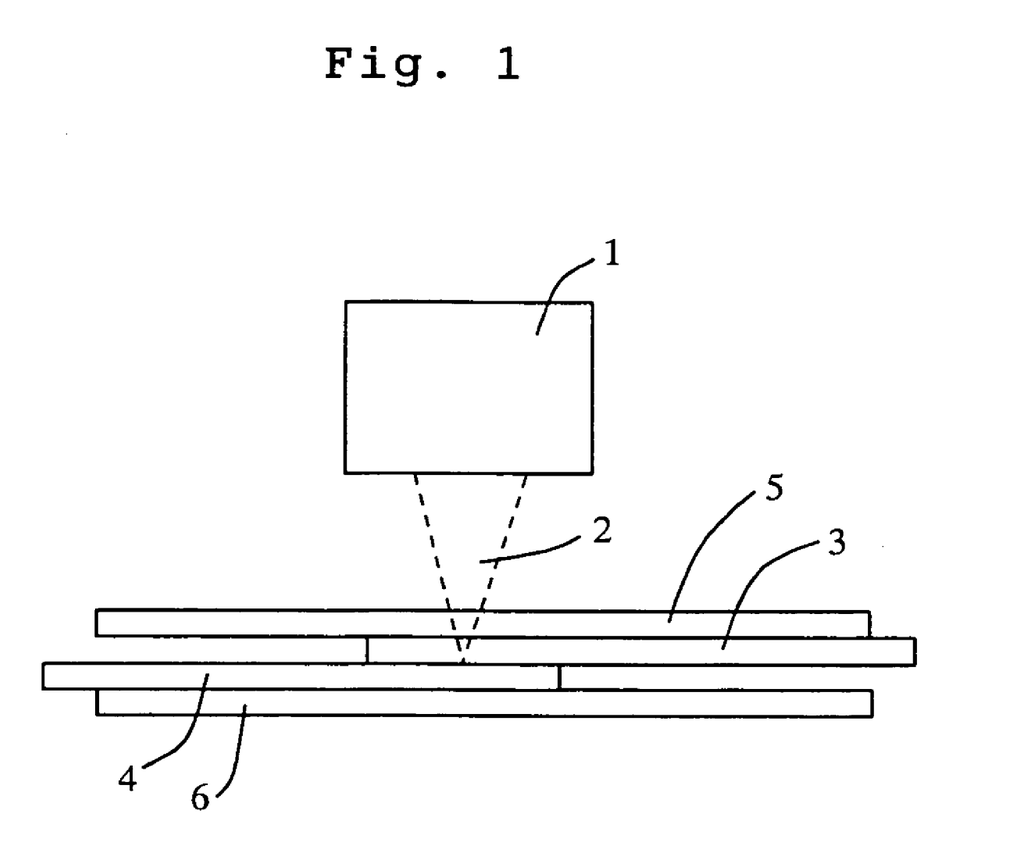
FIG. 1 shows a schematic side elevational view for illustrating a laser welding in Examples.
Figure 2:
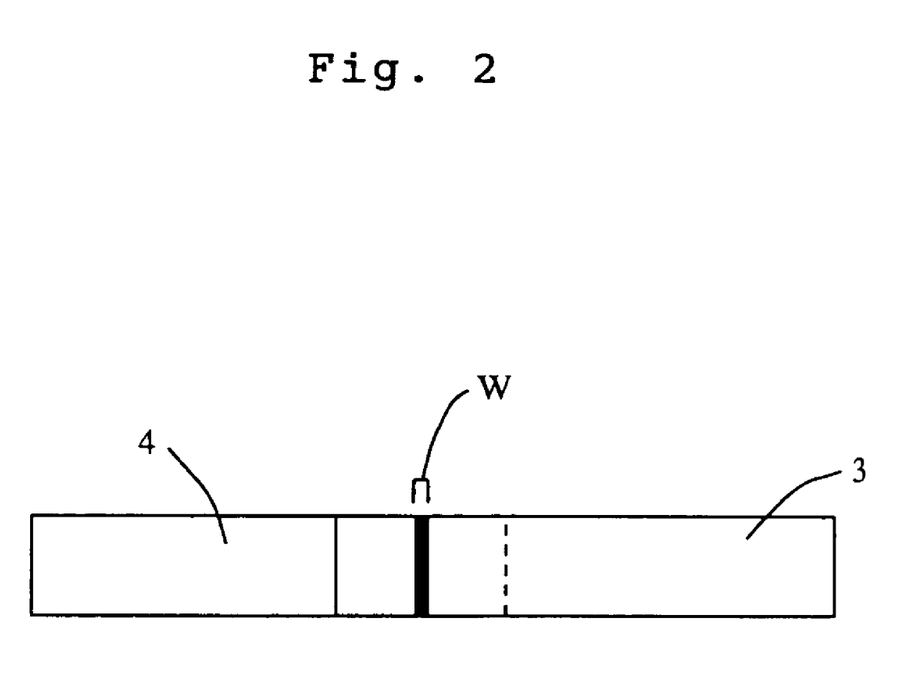
FIG. 2 shows a plan view for illustrating a laser welding in Examples.

As shown in FIG. 1 and FIG. 2, the test piece "A" (3) and the test piece "B" (4) were interposed and fixed between an acrylic plate (5) and a metal plate (6) with a state where the test piece "A" was partly superposed and put on the test piece "B". A laser beam (2) from a light source (1) was focused and condensed on the contact surface between the test pieces "A" and "B" in a line width W (2 mm), and irradiated from the side of the test piece "A" (3) to weld the test pieces with the use of a laser welding machine (FLS iron) (manufactured by Japan Laser Corporation) under laser output and scanning rate conditions shown in Tables.

Incidentally, in Examples and Comparative Examples shown in Table 1, the irradiation was conducted by a laser beam of a wavelength 810 nm.

Moreover, in Examples and Comparative Examples shown in Tables 2 to 4, the irradiation was conducted by a laser beam of a wavelength 940 nm with the use of a laser welding machine manufactured by Leister Process Technologies ("MODULAS welding system C type"), and a quarts glass plate instead of the acrylic plate.

(1) Measurement of Welding Strength

The laser-welded test pieces "A" and "B" were pulled and sheared by using a tensile tester (manufactured by Toyo Boldwin Co., Ltd., "UTM-2.5T") at a rate of 5 mm/minute, and the welding strength was determined.

(2) Light Transmittance

The light transmittance of the test piece "A" for a wavelength of 940 nm was measured by using a spectrophotometer (manufactured by JASCO Corporation, "V570").

The results of Examples and Comparative Examples are shown in Tables 1 to 4.

TABLE 1

|  | Examples |  |  |  |  |  |  |  |  | Comparative Examples |  |  |
|---|---|---|---|---|---|---|---|---|---|---|---|---|
|  | 1 | 2 | 3 | 4 | 5 | 6 | 7 | 8 | 9 | 1 | 2 | 3 |
| (A) PBT-series resin (parts by weight) | | | | | | | | | | | | |
| (A-1) PBT resin | 45 | | | | | | | 65 | | 70 | | 100 |
| (A-2) PBT resin modified with DMI | | 45 | | 40 | 40 | 35 | 45 | | 65 | | 70 | |
| (A-3) PBT resin modified with EBPA | | | 45 | | | | | | | | | |
| (B) Resin (parts by weight) | | | | | | | | | | | | |
| (B-1) PC resin | 25 | 25 | 25 | | | | | 25 | 35 | 35 | | |
| (B-2) AS resin | | | | 30 | | | | | | | | |
| (B-3) PET resin | | | | | 30 | 35 | | | | | | |

TABLE 1-continued

|  | Examples | | | | | | | | | Comparative Examples | | |
| --- | --- | --- | --- | --- | --- | --- | --- | --- | --- | --- | --- | --- |
|  | 1 | 2 | 3 | 4 | 5 | 6 | 7 | 8 | 9 | 1 | 2 | 3 |
| (C) Glass fiber (parts by weight) | 30 | 30 | 30 | 30 | 30 | 30 | 30 | 0 | 0 | 30 | 30 | 0 |
| (B)/(A) (weight ratio) | 0.56/1 | 0.56/1 | 0.56/1 | 0.75/1 | 0.75/1 | 1.00/1 | 0.56/1 | 0.54/1 | 0.54/1 | 0/1 | 0/1 | 0/1 |
| Mold temperature (° C.) | 40 | 40 | 40 | 40 | 40 | 40 | 40 | 40 | 40 | 40 | 40 | 40 |
| Laser output (W) | 34 | 34 | 34 | 34 | 34 | 34 | 34 | 34 | 34 | 34 | 34 | 34 |
| Scanning rate (mm/sec.) | 3 | 3 | 3 | 3 | 3 | 3 | 3 | 3 | 3 | 3 | 3 | 3 |
| Light transmittance (940 nm)(%) | 25 | 30 | 30 | 22 | 23 | 25 | 31 | 30 | 35 | 12 | 13 | 14 |
| Laser welding strength (MPa) | 27 | 31 | 30 | 31 | 31 | 32 | 30 | 11 | 12 | 0 | 0 | 0 |

TABLE 2

|  | Examples | | | | | Comparative Examples | |
| --- | --- | --- | --- | --- | --- | --- | --- |
|  | 10 | 11 | 12 | 13 | 14 | 4 | 5 |
| (A) PBT-series resin (parts by weight) | | | | | | | |
| (A-1) PBT resin | 49 | 45 | | | | 70 | |
| (A-2) PBT resin modified with DMI | | | 45 | 35 | 45 | | 70 |
| (B) Resin (parts by weight) | | | | | | | |
| (B-1) PC resin | 21 | 25 | 25 | | | | |
| (B-2) AS resin | | | | | 25 | | |
| (B-3) PET resin | | | | 35 | | | |
| (C) Glass fiber (parts by weight) | 30 | 30 | 30 | 30 | 30 | 30 | 30 |
| (B)/(A) (weight ratio) | 0.43/1 | 0.56/1 | 0.56/1 | 1.0/1 | 0.56/1 | 0/1 | 0/1 |
| Mold temperature (° C.) | 40 | 40 | 40 | 40 | 40 | 40 | 40 |
| Laser output (W) | 24 | 24 | 24 | 24 | 24 | 24 | 24 |
| Scanning rate (mm/sec.) | 3 | 3 | 3 | 3 | 3 | 3 | 3 |
| Light transmittance (940 nm) (%) | 23 | 25 | 30 | 25 | 17 | 12 | 13 |
| Laser welding strength (MPa) | 20 | 31 | 32 | 30 | 15 | 0 | 0 |

TABLE 3

|  | Examples | | | | | Comparative Examples | | | |
| --- | --- | --- | --- | --- | --- | --- | --- | --- | --- |
|  | 15 | 16 | 17 | 18 | 19 | 6 | 7 | 8 | 9 |
| (A) PBT-series resin (parts by weight) | | | | | | | | | |
| (A-1) PBT resin | 49 | | | | | 70 | | 70 | |
| (A-2) PBT resin modified with DMI | | 49 | 63 | 56 | 49 | | 70 | | 70 |
| (B) Resin (parts by weight) | | | | | | | | | |
| (B-1) PC resin | 21 | 21 | 7 | 14 | 21 | | | | |
| (C) Glass fiber (parts by weight) | 30 | 30 | 30 | 30 | 30 | 30 | 30 | 30 | 30 |
| (B)/(A) (weight ratio) | 0.43/1 | 0.43/1 | 0.11/1 | 0.25/1 | 0.43/1 | 0/1 | 0/1 | 0/1 | 0/1 |
| Mold temperature (° C.) | 80 | 80 | 80 | 80 | 80 | 80 | 80 | 80 | 80 |
| Laser output (W) | 23 | 23 | 27 | 27 | 27 | 23 | 23 | 27 | 27 |
| Scanning rate (mm/sec.) | 2 | 2 | 3 | 3 | 3 | 2 | 2 | 3 | 3 |
| Light transmittance (940 nm) (%) | 18 | 22 | 17 | 20 | 22 | 11 | 13 | 11 | 13 |
| Laser welding strength (MPa) | 15 | 35 | 11 | 20 | 33 | 0 | 4 | 0 | 0 |

TABLE 4

|  | Examples | | | | | Comparative Examples | | | |
| --- | --- | --- | --- | --- | --- | --- | --- | --- | --- |
|  | 20 | 21 | 22 | 23 | 24 | 10 | 11 | 12 | 13 |
| (A) PBT-series resin (parts by weight) | | | | | | | | | |
| (A-1) PBT resin | | | | | | 70 | | 70 | |
| (A-2) PBT resin modified with DMI | 56 | 45 | 45 | 45 | 45 | | 70 | | 70 |
| (B) Resin (parts by weight) | | | | | | | | | |
| (B-1) PC resin | 14 | 25 | 25 | 25 | 25 | | | | |
| (C) Glass fiber (parts by weight) | 30 | 30 | 30 | 30 | 30 | 30 | 30 | 30 | 30 |
| (B)/(A) (weight ratio) | 0.25/1 | 0.56/1 | 0.56/1 | 0.56/1 | 0.56/1 | 0/1 | 0/1 | 0/1 | 0/1 |
| Mold temperature (° C.) | 80 | 80 | 80 | 80 | 80 | 80 | 80 | 80 | 80 |
| Laser output (W) | 60 | 60 | 60 | 60 | 60 | 60 | 60 | 60 | 60 |
| Scanning rate (mm/sec.) | 20 | 20 | 50 | 100 | 150 | 20 | 20 | 50 | 50 |
| Light transmittance (940 nm) (%) | 20 | 24 | 24 | 24 | 24 | 11 | 13 | 11 | 13 |
| Laser welding strength (MPa) | 25 | 28 | 23 | 15 | 14 | 0 | 0 | 0 | 0 |

In Examples, the transmittance relative to the laser beam and welding strength were high, and the welding strength was improved. On the other hand, in Comparative Examples, any samples failed to be laser-welded, or showed remarkably low laser weldability.

The invention claimed is:

1. A laser-welding process which comprises the steps of laser-welding first and second shaped resin articles so as to bond one to another by passing a laser beam through the first shaped resin article, wherein the first shaped resin article is molded from a laser-weldable resin composition which comprises:
   at least one a polybutylene terephthalate-series resin (A) comprising a polybutylene terephthalate-series copolymer modified with 0.01 to 30 mol % of a copolymerizable monomer, and
   at least one resin (B) selected from the group consisting of a polycarbonate-series resin (b1), a styrenic resin (b2), a polyethylene terephthalate-series resin (b3) and an acrylic resin (b4), wherein
   the copolymerizable monomer comprises at least one member selected from the group consisting of phthalic acid, isophthalic acid, an adduct of bisphenol A with an alkylene oxide, and a reactive derivative thereof.

2. A process according to claim 1, wherein the first shaped resin article has a light transmittance of not less than 15% for a wavelength of 800 to 1100 nm through an injection molded test niece formed of the resin composition having a thickness of 3 mm.

3. A process according to claim 1, wherein the laser-weldable composition further comprises a reinforcer capable of transmitting a laser beam.

4. A process according to claim 1, wherein the laser-weldable composition further comprises a glass fiber.

5. A shaped composite article comprising first and second shaped resin articles laser-welded to one another, wherein the first shaped resin article is molded from a laser-weldable polybutylene terephthalate-series resin composition which comprises:
   at least one polybutylene terephthalate-series resin (A) comprising a polybutylene terephthalate-series copolymer modified with 0.01 to 30 mol % of a copolymerizable monomer, and
   at least one resin (B) selected from the group consisting of a polycarbonate-series resin (b1), a styrenic resin (b2), a polyethylene terephthalate-series resin (b3), and an acrylic resin (b4), wherein
   the weight ratio (B)/(A) of the resin (B) relative to the polybutylene terephthalate-series resin (A) is 0.1/1 to 1.5/1, and wherein
   the copolymerizable monomer comprises at least one member selected from the group consisting of phthalic acid, isophthalic acid, an adduct of bisphenol A with an alkylene oxide, and a reactive derivative thereof.

6. A composite article according to claim 5, wherein the first shaped article has a light transmittance of not less than 15% for a wavelength of 800 to 1100 nm through an injection molded test piece formed of the resin composition having a thickness of 3 mm.

7. A composite article according to claim 5, wherein the laser-weldable composition further comprises a reinforcer capable of transmitting a laser beam.

8. A composite article according to claim 5, wherein the laser-weldable composition further comprises a glass fiber.

9. A shaped composite article comprising first and second shaped resin members that are laser-bonded to one another along an interface therebetween, wherein
   the first shaped resin member is formed from a polybutylene terephthalate-series resin composition that is sufficiently transparent to a laser beam to allow the first shaped member to be laser-bonded to the second shaped resin member along the interface therebetween, wherein the resin composition comprises:
   a polybutylene terephthalate-series resin (A) and
   an amount of a resin (B) which is sufficient to impart to the resin composition an ability to be laser welded to a counterpart resin, wherein the resin (B) is at least one resin selected from the group consisting of a polycarbonate-series resin (b1), a polyethylene terephthalate-series resin (b3) and an acrylic resin (b4), wherein
   the polybutylene terephthalate-series resin (A) comprises a polybutylene terephthalate-series copolymer modified with 0.01 to 30 mol % of a copolymerizable monomer, the copolymerizable monomer comprising at least one member selected from the group consisting of a bisphenol compound or an adduct thereof with an alkylene oxide, and an asymmetrical aromatic dicarboxylic acid or a derivative thereof capable of forming an ester, and wherein the resin composition exhibits a light transmittance of not less than 15% for a wavelength of 800 to 1100 nm through an injection molded test piece formed of the resin composition having a thickness of 3 mm.

10. A shaped composite article according to claim 9, wherein the copolymerizable monomer comprises at least one member selected from the group consisting of phthalic acid, isophthalic acid, and an adduct of bisphenol A with an alkylene oxide, and a reactive derivative thereof.

11. A shaped composite article according to claim 9, wherein the weight ratio (B)/(A) of the resin (B) relative to the polybutylene terephthalate-series resin (A) is 0.1/1 to 1.5/1.

12. A shaped composite article according to claim 9, wherein the resin composition further comprises a reinforcer capable of transmitting a laser beam.

13. A shaped composite article according to claim 9, wherein the resin composition further comprises a glass fiber.

14. A shaped composite article according to claim 9, wherein the resin (B) is present in an amount to achieve a weight ratio (B)/(A) of the resin (B) relative to the polybutylene terephthalate-series resin (A) 0.1/1 to 1.5/1, which amount is sufficient to impart to the composition an ability to be laser welded to a counterpart resin.

* * * * *